(12) United States Patent
Larikova et al.

(10) Patent No.: US 10,439,711 B2
(45) Date of Patent: Oct. 8, 2019

(54) LASER SAFETY IN DATA CENTERS AND OTHER REMOTE SITES

(71) Applicant: Coriant Operations, Inc., Naperville, IL (US)

(72) Inventors: Julia Y. Larikova, Naperville, IL (US); Yajun Wang, Naperville, IL (US)

(73) Assignee: Coriant Operations, Inc., Naperville, IL (US)

( * ) Notice: Subject to any disclaimer, the term of this patent is extended or adjusted under 35 U.S.C. 154(b) by 0 days.

(21) Appl. No.: 15/923,105

(22) Filed: Mar. 16, 2018

(65) Prior Publication Data

US 2018/0269965 A1 Sep. 20, 2018

Related U.S. Application Data

(60) Provisional application No. 62/473,306, filed on Mar. 17, 2017.

(51) Int. Cl.
*H04B 10/00* (2013.01)
*H04B 10/075* (2013.01)
*H04J 14/00* (2006.01)

(52) U.S. Cl.
CPC ....... *H04B 10/075* (2013.01); *H04B 2210/08* (2013.01)

(58) Field of Classification Search
CPC .............. H04B 2210/08; H04B 10/073; H04B 10/0731; H04B 10/077
See application file for complete search history.

(56) References Cited

U.S. PATENT DOCUMENTS 6,359,708 B1 * 3/2002 Goel .................... H04B 10/564
398/15
6,583,867 B1 * 6/2003 Jennings .............. H04B 10/071
356/73.1

(Continued)

OTHER PUBLICATIONS

Hinton et al., "Automatic Laser Shutdown Implications for All Optical Data Networks," Journal of Litghtwave Technology, vol. 24, No. 2, 8 pages (Feb. 2006).

(Continued)

*Primary Examiner* — Daniel G Dobson
(74) *Attorney, Agent, or Firm* — Hamilton, Brook, Smith & Reynolds, P.C.

(57) ABSTRACT

The disclosed methods, apparatus, and systems allow safe and easy deployment of amplifier products that exceed laser safe limits without the need for fiber testing and characterization or OTDR techniques. One example embodiment is a method for ensuring eye safety in an optical network. The example method includes detecting optical connectivity between an output of a transmit amplifier and a passive optical processing element. The transmit amplifier is located at a first network node and is configured to output optical power greater than eye-safe level. The passive optical processing element is located at a second network node and is configured to guarantee a reduction of a maximum optical power level at an output side of the passive optical processing element to an eye-safe optical level. The detecting occurs at the first network node, and the transmit amplifier is enabled or disabled as a function of detection of the optical connectivity.

50 Claims, 7 Drawing Sheets

(56) References Cited

U.S. PATENT DOCUMENTS

2002/0024690 A1* 2/2002 Iwaki .................. H04B 10/03
398/13
2003/0002109 A1 1/2003 Hochberg et al.

OTHER PUBLICATIONS

MPB Communications Inc., RMH Series Technical Manual, MPBC Document No. DOC-02336 Rev. 8, p. 59 (Feb. 27, 2006).
International Standard, Publication IEC 60825-1, Edition 2.0, 2007, Group Safety Publication "Safety of laser products, Part 1: Equipment classification and requirements", 206 pages.
International Standard, Publication IEC 60825-2, Edition 3.0, 2004, "Safety of laser products, Part 2: Safety of optical fibre communication systems (OFCS)", 116 pages.

\* cited by examiner

US 10,439,711 B2

LASER SAFETY IN DATA CENTERS AND OTHER REMOTE SITES

RELATED APPLICATION

This application claims the benefit of U.S. Provisional Application No. 62/473,306, filed on Mar. 17, 2017. The entire teachings of the above application are incorporated herein by reference.

BACKGROUND

Laser light has the ability to cause permanent eye injuries. Because of this, the sale and usage of lasers is typically subject to government regulations. Direct detect modulations currently planned for deployment in Data Center Interconnect (DCI) applications require very high output power levels in amplifiers, exceeding laser safety limits.

SUMMARY

The disclosed methods, apparatus, and systems allow safe and easy deployment of amplifier products that exceed laser safe limits without the need for fiber testing and characterization or optical time-domain reflectometer (OTDR) techniques.

One example embodiment is a method for ensuring eye safety in an optical network. The example method includes detecting optical connectivity between an output of a transmit amplifier and a passive optical processing element. The transmit amplifier is located at a first network node and is configured to output optical power greater than eye-safe level. The passive optical processing element is located at a second network node and is configured to guarantee a reduction of a maximum optical power level at an output side of the passive optical processing element to an eye-safe optical level. The detecting occurs at the first network node, and the transmit amplifier is enabled or disabled as a function of detection of the optical connectivity.

Another example embodiment is a method for ensuring eye safety in an optical network that includes detecting optical connectivity between an output of a transmit amplifier configured to output optical power greater than eye-safe level and an input of a receiving element. The receiving element is configured to guarantee a reduction of a maximum optical power level of the transmit amplifier to an eye-safe optical level. The method further includes enabling the transmit amplifier to output the optical power based on a positive detection of the optical connectivity.

Another example embodiment is a node in an optical network. The node includes a transmit amplifier configured to output optical power greater than eye-safe level. The node further includes a detector configured to detect optical connectivity between an output of the transmit amplifier and a receiving element at another network node. The receiving element is configured to guarantee a reduction of a maximum optical power level of the transmit amplifier to an eye-safe optical level. The detector is further configured to enable the transmit amplifier to output the optical power based on a positive detection of the optical connectivity.

The transmit amplifier can also be disabled based on a negative detection of optical connectivity. Detecting the optical connectivity and enabling the transmit amplifier can be performed without regard to loss of power of an optical test signal used to detect the optical connectivity. For example, detecting the optical connectivity can include transmitting an amplified or non-amplified pilot tone to the passive optical processing element, or modulating power of a communication wavelength output from the transmit amplifier. Detecting the optical connectivity can also include transmitting a signal from the first network node, at which the transmit amplifier is located, and receiving the signal at the first network node. In such an embodiment, transmitting the signal from the first network node can be performed over an optical transmitting path, and receiving the signal at the second network node can be performed over an optical receiving path. The optical transmitting path and optical receiving path may be a common optical path or separate optical paths. Detecting the optical connectivity can include using a transmit amplifier optical power greater than or equal to a minimum power or intensity value for eye danger at a location at which connectivity may fail or be caused to fail.

The passive optical processing element can be an optical splitter or an optical filter. The passive optical processing element can also be an optical demultiplexer configured to operate in a communication band, in which case detecting the optical connectivity can include passively routing a test signal in the communication band or in a different band. The passive optical processing element may guarantee reduction of optical power to less than or equal to a maximum power or intensity value to guarantee eye safety at a customer use output side of the passive optical processing element.

BRIEF DESCRIPTION OF THE DRAWINGS

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

DETAILED DESCRIPTION

A description of example embodiments of the invention follows.

In some applications, power levels as high as 26 dBm may be deployed within a data center, sometimes on the same floor, and sometimes as far away as 300 meters in a different building. In such cases, the portion of the line system carrying amplifiers may be located on one floor or building, and the passive termination unit (AAWG, filters, etc.) may be located on a different floor or building, separated by many (e.g., dozens) connectors and patch panels.

Current methods for achieving laser safety include the use of an optical supervisory channel or back reflection apparatus, both of which may not be possible to deploy in cases where the amplifiers and passive elements are located at greater distances. Use of an optical supervisory channel may not be possible due to the passive module types deployed on the receiving end of 26 dBm power levels. Use of a back reflection apparatus may not be possible due to the multitude of connectors and high levels of reflections introduced by them.

Figure 1:
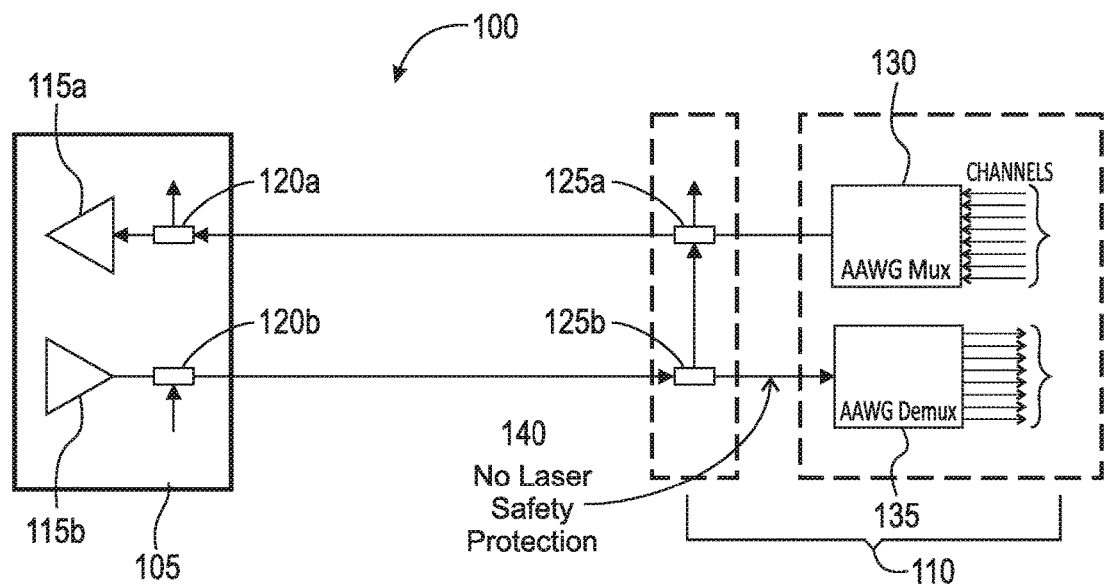
FIG. 1 is a schematic diagram illustrating a portion of an optical network.

FIG. 1 is a schematic diagram illustrating a portion of an optical network 100 as in prior systems. The portion of the network 100 includes a first node 105 and a second node 110. The first node 105 includes amplifiers 115a,b and add/drop components (e.g., filters or couplers) 120a,b. The second node 110 includes add/drop components 125a,b, a multiplexer (mux) 130, and a demultiplexer (demux) 135. Demux 135 can reduce the laser power level to a safe level. But there is a possibility that the demux 135 can be decoupled (at point 140) from add/drop component 125b, resulting in potentially exposure of unsafe laser power levels.

Figure 2:
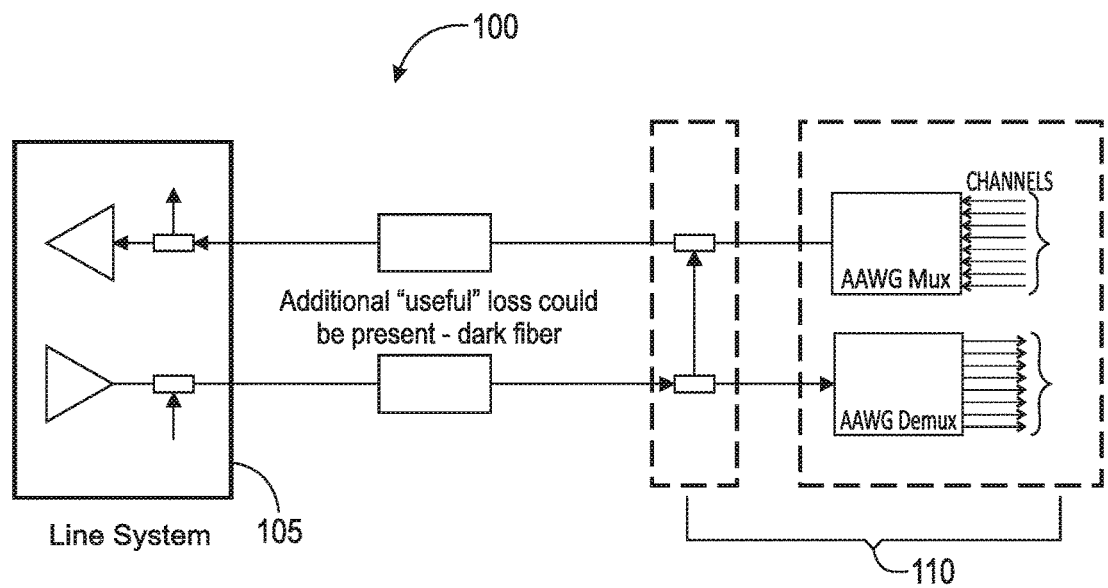
FIG. 2 is a schematic diagram illustrating a portion of an optical network.
Figure 3:
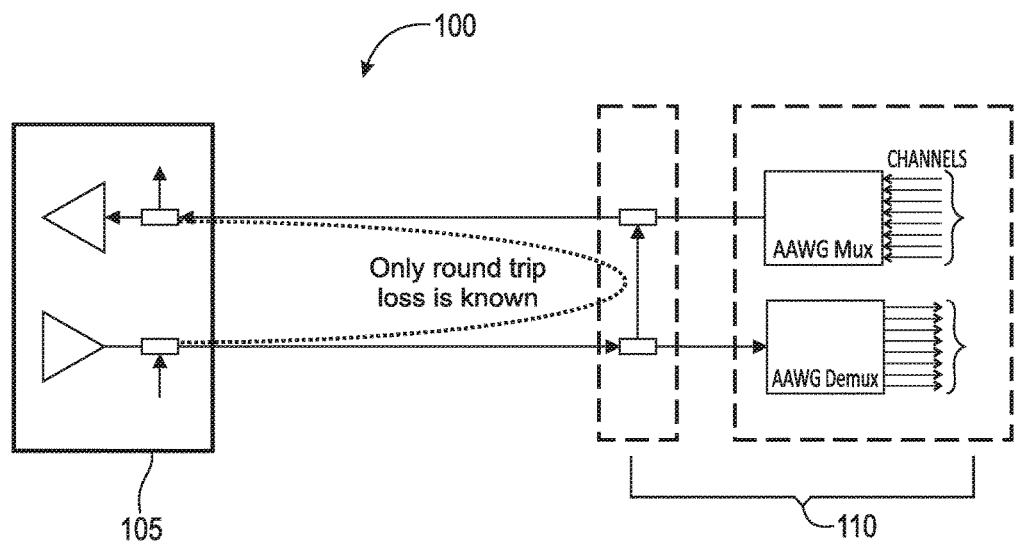
FIG. 3 is a schematic diagram illustrating a portion of an optical network.

Existing implementations are not able to determine the power level at the opposite end of the span (unless power is measured there, which is not the case in a passive system). FIGS. 2 and 3 are schematic diagrams illustrating the portion of optical network 100 of FIG. 1. FIGS. 2 and 3 further illustrates that while loss may be present along the connection between the first and second nodes 105, 110, that loss is not known at the passive end 110.

Figure 4:
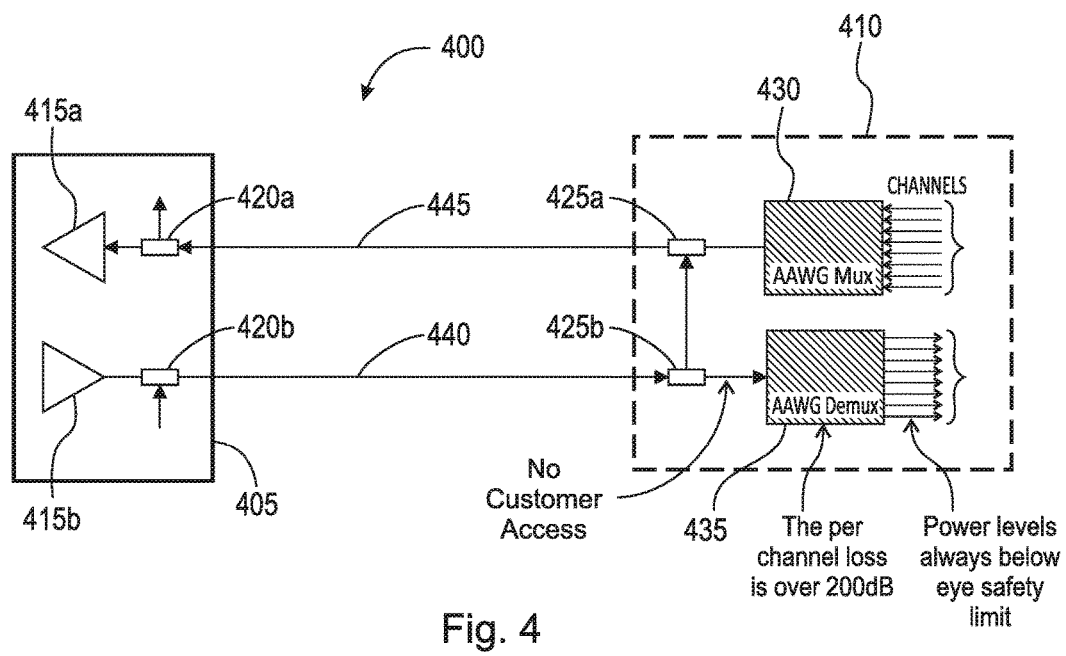
FIG. 4 is a schematic diagram illustrating a portion of an optical network, according to an example embodiment.

FIG. 4 is a schematic diagram illustrating a portion of an optical network 400, according to an example embodiment. The portion of the network 400 includes a first node 405 and a second node 410. The first node 405 includes amplifiers 415a,b and add/drop components (e.g., filters or couplers) 420a,b. The second node 410 includes add/drop components 425a,b, a multiplexer (mux) 430, and a de-multiplexer (demux) 435. Demux 435 can reduce the laser power level to a safe level. The network 400 can use a pilot tone outside of the C-band or one of the C-band wavelengths, sent over the demux fiber 440 and returned over the mux fiber 445 to the first node 405, indicating a complete, connected optical path. The tone that may be used to provide this function does not have to be supplied by a separate transceiver. It can be shared between existing frequencies available for other functions, such as OSC or OTDR or dispersion measurement circuits, such as 1510 nm or 1610 nm, as its exact data pattern or power levels are irrelevant. It is the completed path (return to the sender at the first node 105) that matters.

The disclosed configuration is not a fiber monitoring loss system. It does not matter what the fiber loss is. The configuration continues to operate in the presence of any additional losses in the fiber that could be useful to the customer, such as glass nodes or switches. The roundtrip loss has no relevance on the operability of the eye safety mechanism because neither a very good loss nor a very bad loss is deterministic enough in terms of where the loss is (Tx or Rx fiber) and whether it should be there.

By integrating laser safety directly into the demux 435, the configuration of FIG. 4 resolves problems with the interface between the WDM return point and the customer interface, where, in prior networks, there is a laser safety concern as the power levels can still be very high there. Presence of the fiber monitoring mechanism without the loss mechanism and customer accessible connectors in between cannot alone guarantee complete point-to-point laser safety. It is not important what kind loss there may be, nor where loss occurs. This is because, as long as the tone returns back to the origin (the first node 405), the link is complete and the demux 435 (or other passive device guaranteeing eye-safe power levels) is doing its "job" of introducing enough loss in the path to guarantee power levels below eye safety limits at the connectors available to the consumer.

Figure 5:
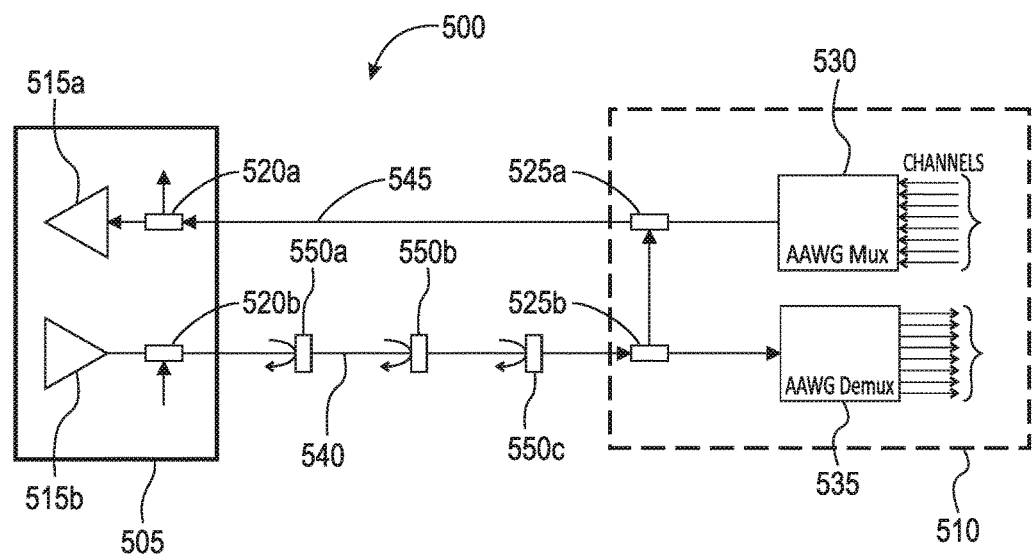
FIG. 5 is a schematic diagram illustrating a portion of an optical network, according to an example embodiment.

FIG. 5 is a schematic diagram illustrating a portion of an optical network 500, according to an example embodiment. The portion of the network 500 includes a first node 505 and a second node 510. The first node 505 includes amplifiers 515a,b and add/drop components (e.g., filters or couplers) 520a,b. The second node 510 includes add/drop components 525a,b, a multiplexer (mux) 530, and a de-multiplexer (demux) 535. Demux 535 can reduce the laser power level to a safe level. Also shown are a number of connectors 550a-c (e.g., patch panels or switches) along the demux fiber 540. The network 500 can use a pilot tone outside of the C-band or one of the C-band wavelengths, sent over the demux fiber 540 and returned over the mux fiber 545 to the first node 505, indicating a complete, connected optical path.

Figure 6:
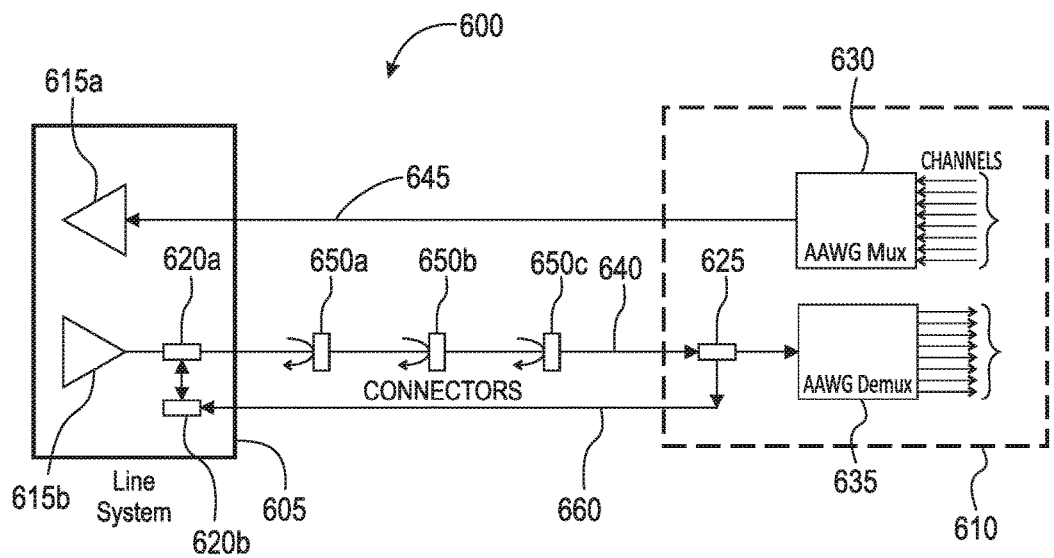
FIG. 6 is a schematic diagram illustrating a portion of an optical network, according to an example embodiment.

FIG. 6 is a schematic diagram illustrating a portion of an optical network 600, according to an example embodiment. The configuration illustrates an alternative approach that uses a third fiber 660 connecting the amplifier node 605 and the passive node 610, bypassing the mux module 635. The portion of the network 600 includes a first node 605 and a second node 610. The first node 605 includes amplifiers 615a,b and add/drop components (e.g., filters or couplers) 620a,b. The second node 610 includes an add/drop components 625, a multiplexer (mux) 630, and a de-multiplexer (demux) 635. Demux 635 can reduce the laser power level to a safe level. Also shown are a number of connectors 650a-c along the demux fiber 640. The network 600 can use a pilot tone outside of the C-band or one of the C-band wavelengths sent over the demux fiber 640 and returned over the third fiber 660 to the first node 605.

Figure 7:
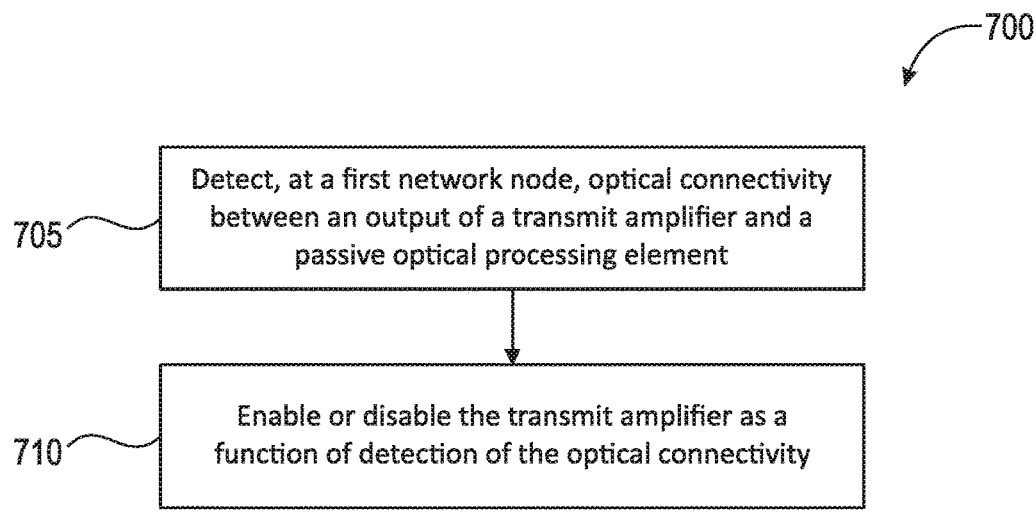
FIG. 7 is a flow diagram illustrating ensuring eye safety in an optical network, according to an example embodiment.

FIG. 7 is a flow diagram illustrating an example method 700 of ensuring eye safety in an optical network, according to an example embodiment. The example method 700 includes detecting 705, at a first network node, optical connectivity between an output of a transmit amplifier and a passive optical processing element. The method 700 further includes enabling or disabling 710 the transmit amplifier as a function of detection of the optical connectivity.

Figure 8:
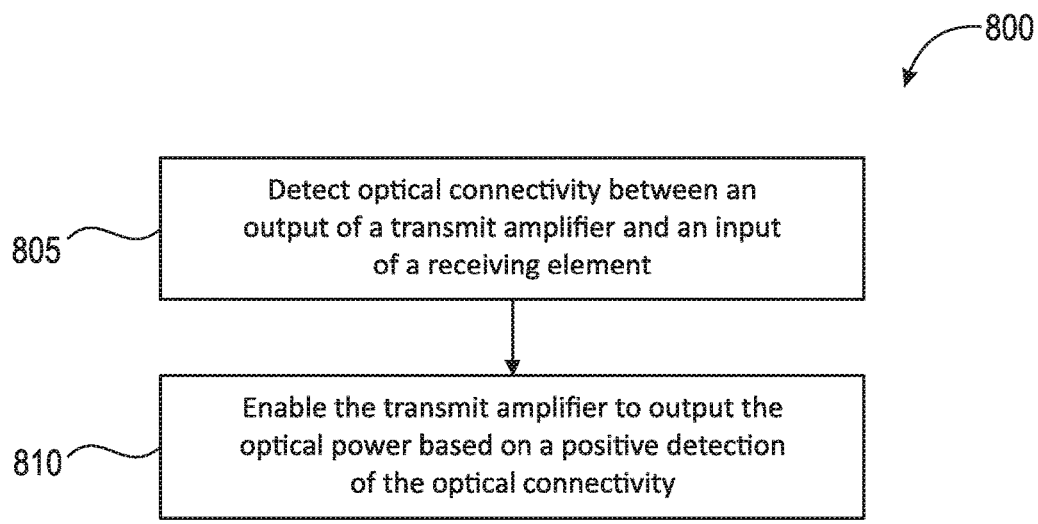
FIG. 8 is a flow diagram illustrating ensuring eye safety in an optical network, according to an example embodiment.

FIG. 8 is a flow diagram illustrating an example method 800 of ensuring eye safety in an optical network, according to an example embodiment. The example method 800 includes detecting 805 optical connectivity between an output of a transmit amplifier and an input of a receiving element. The method 800 further includes enabling 810 the transmit amplifier to output the optical power based on a positive detection of the optical connectivity.

Figure 9:
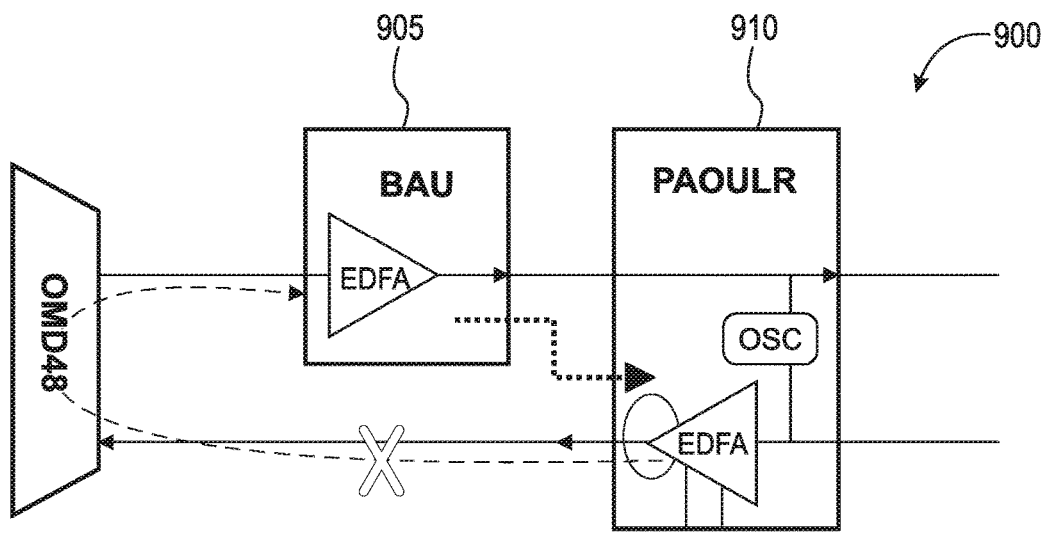
FIG. 9 is a schematic diagram illustrating a portion of an optical network, according to an example embodiment.
Figure 10:
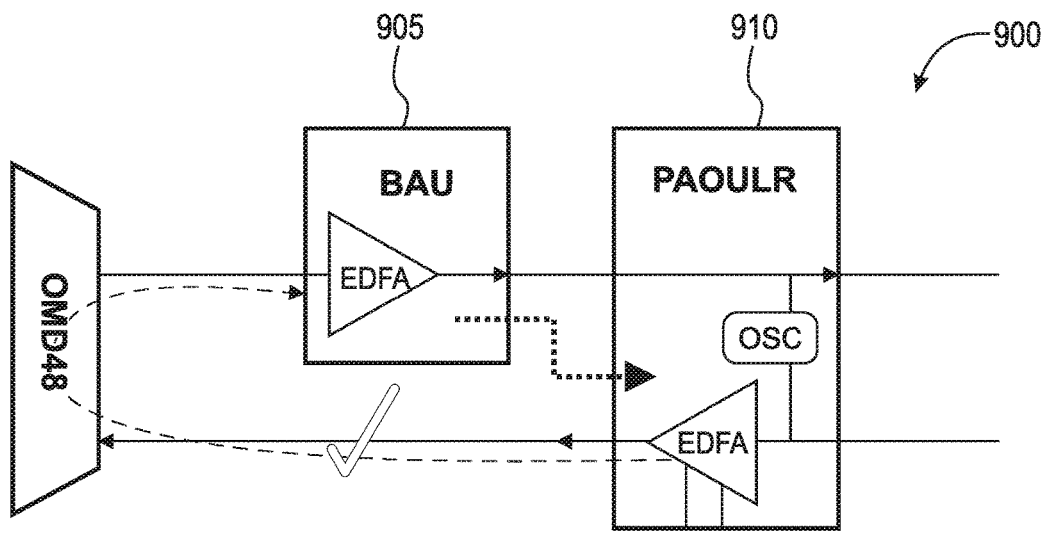
FIG. 10 is a schematic diagram illustrating a portion of an optical network, according to an example embodiment.

FIGS. 9 and 10 are schematic diagrams illustrating a portion of an optical network 900, according to an example embodiment. FIGS. 9 and 10 illustrate an example implementation for port side laser safety, where the objective is to enable automatic laser on/off on the port side of an OFP2 PAM4 PA module when the associated BA detects loss-of-signal (LOS) on the OSC1610 channel, for example. According to the example implementation, the laser is shutdown if BAU 905 detects LOS on the 1610 nm OSC channel. Upon LOS detection, BAU 905 can change an OSC1610-LOS pin from low to high. PAOULR 910 can detect the OSC1610-LOS pin raise edge trigger and can turn the associated PA pump off. The laser can be recovered if the BAU 905 detects that the LOS on 1610 nm OSC has been cleared. Upon the clearance, BAU 905 can turn the OSC1610-LOS pin from high to low. The PAOULR 910 can detect the BA OSC1610-LOS pin down edge trigger and can turn the associated PA pump on.

Figure 11:
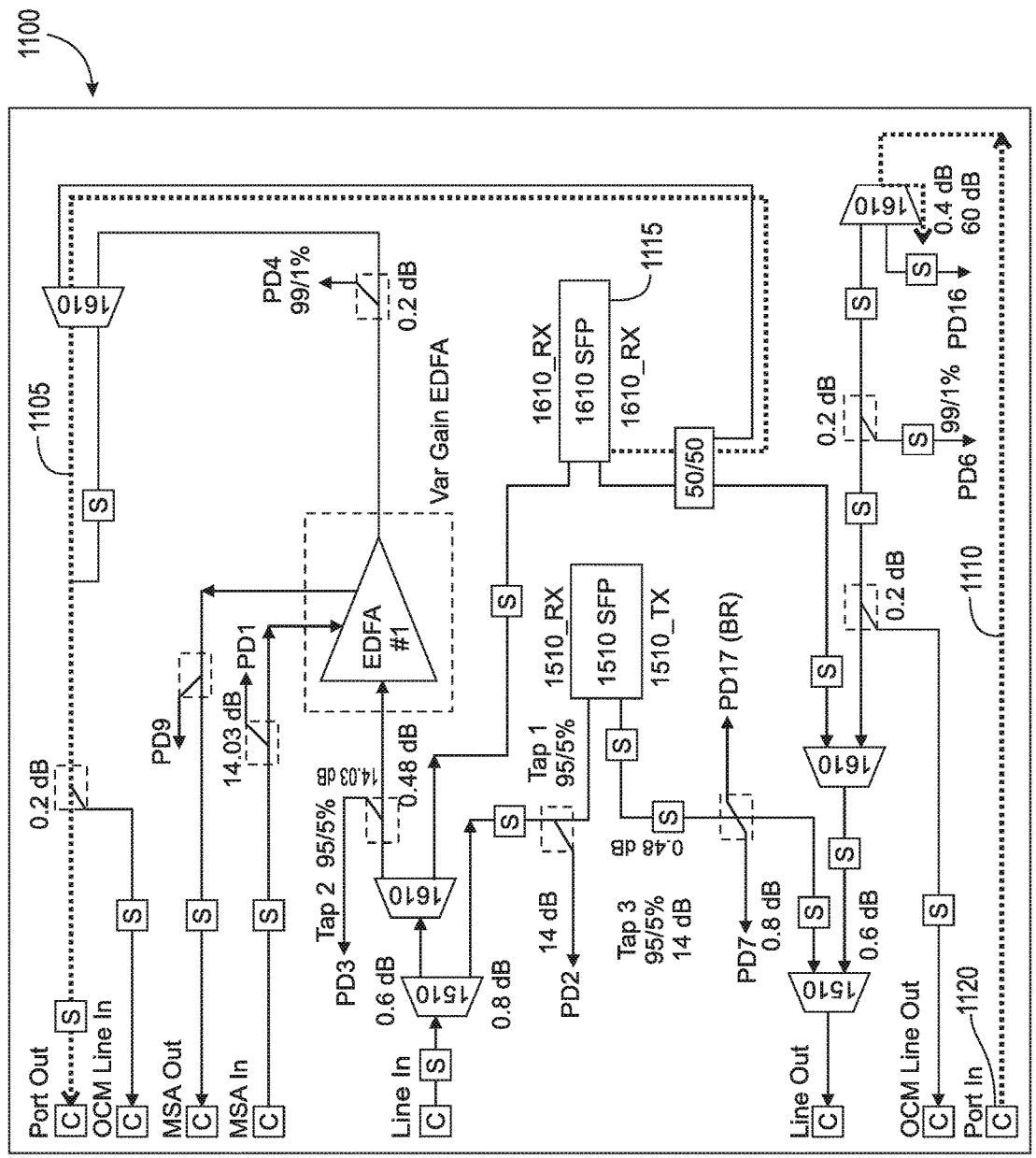
FIG. 11 is a schematic diagram illustrating an example amplifier, according to an example embodiment.

FIG. 11 is a schematic diagram illustrating an example amplifier 1100 that can be used to implement the embodiments disclosed herein. Eye safety defense is need as the amplifier 1100 can exceed 1M. The two bold lines 1105 and 1110 show how a pilot tone (e.g., 1610 nm) can originate 1115 and be detected on another other input 1120.

Figure 12:
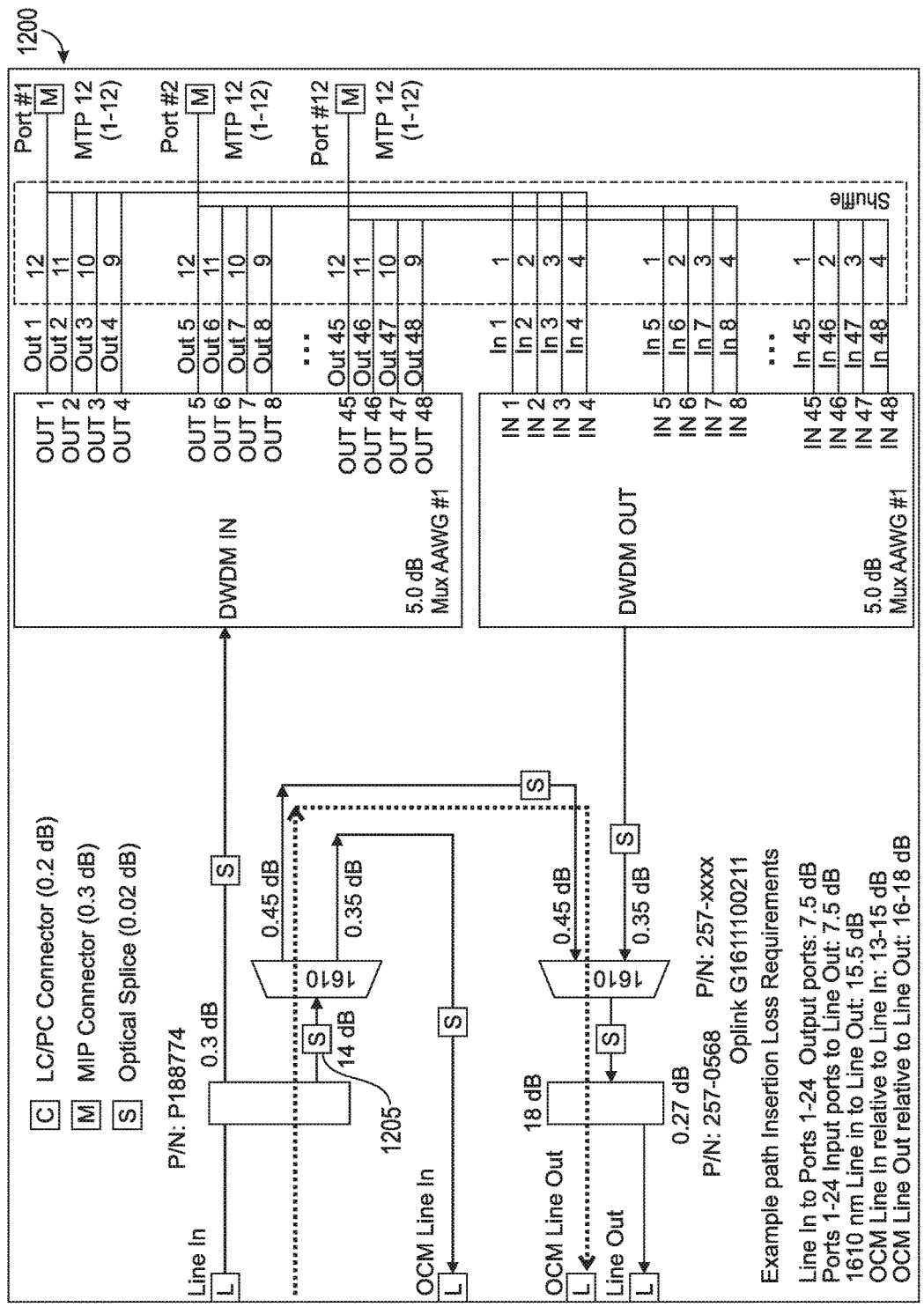
FIG. 12 is a schematic diagram illustrating an example mux/demux module, according to an example embodiment.

FIG. 12 is a schematic diagram illustrating a mux/demux module 1200 that can be used to implement the embodiments disclosed herein. The bold line 1205 shows an example loopback on the mux/demux module 1200.

While this invention has been particularly shown and described with references to example embodiments thereof, it will be understood by those skilled in the art that various changes in form and details may be made therein without departing from the scope of the invention encompassed by the appended claims.

What is claimed is:

1. A method for ensuring eye safety in an optical network, the method comprising:
    detecting optical connectivity between an output of a transmit amplifier and a passive optical processing element, the transmit amplifier being located at a first network node and being configured to output optical power greater than a given level, and the passive optical processing element being located at a second network node and being configured to guarantee a reduction of a maximum optical power level at an output side of the passive optical processing element to the given level, and wherein the detecting occurs at the first network node and includes transmitting a signal from the first network node at which the transmit amplifier is located and receiving the signal at the first network node; and
    enabling or disabling the transmit amplifier as a function of detection of the optical connectivity.

2. The method of claim 1, wherein detecting the optical connectivity includes transmitting an amplified or non-amplified pilot tone to the passive optical processing element.

3. The method of claim 1, wherein detecting the optical connectivity includes modulating power of a communication wavelength output from the transmit amplifier.

4. The method of claim 1, wherein transmitting the signal from the first network node is performed over an optical transmitting path and receiving the signal at the second network node is performed over an optical receiving path, and wherein the optical transmitting path and optical receiving path are a common optical path or separate optical paths.

5. The method of claim 1, wherein the passive optical processing element is an optical demultiplexer configured to operate in a communication band, and wherein detecting the optical connectivity includes passively routing a test signal in the communication band or in a different band.

6. The method of claim 1, wherein the passive optical processing element is an optical splitter or an optical filter.

7. The method of claim 1, further including disabling the transmit amplifier based on a negative detection of optical connectivity.

8. The method of claim 1, wherein detecting the optical connectivity and enabling the transmit amplifier are performed without regard to loss of power of an optical test signal used to detect the optical connectivity.

9. The method of claim 1, wherein detecting the optical connectivity includes using a transmit amplifier optical power greater than or equal to a minimum power or intensity value for eye danger at a location at which connectivity may fail or be caused to fail.

10. The method of claim 1, wherein detecting the optical connectivity includes the passive optical processing element guaranteeing reduction of optical power to less than or equal to a maximum power or intensity value to guarantee eye safety at a customer use output side of the passive optical processing element.

11. A method for ensuring eye safety in an optical network, the method comprising:
    detecting optical connectivity between an output of a transmit amplifier configured to output optical power greater than a given level and an input of a receiving element, the receiving element being configured to guarantee a reduction of a maximum optical power level of the transmit amplifier to the given level, wherein detecting the optical connectivity includes transmitting a signal from a network node at which the transmit amplifier is located and receiving the signal at the network node; and
    enabling the transmit amplifier to output the optical power based on a positive detection of the optical connectivity.

12. The method of claim 11, wherein detecting the optical connectivity includes transmitting an amplified or non-amplified pilot tone to the receiving element.

13. The method of claim 11, wherein detecting the optical connectivity includes modulating power of a communication wavelength output from the transmit amplifier.

14. The method of claim 11, wherein transmitting the signal is performed over an optical transmitting path and receiving the signal at the network node is performed over an optical receiving path, and wherein the optical transmitting path and optical receiving path are a common optical path or separate optical paths.

15. The method of claim 11, wherein the receiving element is an optical demultiplexer configured to operate in a communication band, and wherein detecting the optical connectivity includes passively routing a test signal in the communication band or in a different band.

16. The method of claim 11, wherein the receiving element is an optical splitter or an optical filter.

17. The method of claim 11, further including disabling the transmit amplifier based on a negative detection of optical connectivity.

18. The method of claim 11, wherein detecting the optical connectivity and enabling the transmit amplifier are performed without regard to loss of power of an optical test signal used to detect the optical connectivity.

19. The method of claim 11, wherein detecting the optical connectivity includes using a transmit amplifier optical power greater than or equal to a minimum power or intensity value for eye danger at a location at which connectivity may fail or be caused to fail.

20. The method of claim 11, wherein detecting the optical connectivity includes the receiving element guaranteeing reduction of optical power to less than or equal to a maximum power or intensity value to guarantee eye safety at a customer use output side of the passive optical processing element.

21. A node in an optical network, comprising:
a transmit amplifier configured to output optical power greater than a given level; and
a detector configured to detect optical connectivity between an output of the transmit amplifier and a receiving element at another network node, the receiving element being configured to guarantee a reduction of a maximum optical power level of the transmit amplifier to the given level, and the node configured to detect the optical connectivity by transmitting a signal from the transmit amplifier and receiving the signal at the detector;
the detector configured to enable the transmit amplifier to output the optical power based on a positive detection of the optical connectivity.

22. The method of claim 1, wherein the given level is an eye-safe optical level as defined by the International Electrotechnical Commission.

23. The method of claim 11, wherein the given level is an eye-safe optical level as defined by the International Electrotechnical Commission.

24. The node of claim 21, wherein the given level is an eye-safe optical level as defined by the International Electrotechnical Commission.

25. A method for eye safety in an optical network, the method comprising:
establishing an optical path that extends between at least a first node and a passive element of a second node, wherein the passive element is configured to output an optical power that does not exceed a given level, and wherein the second node does not have an optical interface that provides customer access to any optical power that exceeds the given level along any portion of the optical path within the second node;
communicating a signal along the optical path from the first node to the second node;
returning the signal back to the first node from the second node provided that the optical path is complete between at least the first node and an input to the second node;
detecting at the first node a completeness of the optical path between at least the first node and an input to the second node, based at least on whether the signal returns to the first node; and
controlling whether the first node outputs onto the optical path an optical power greater than the given level, based at least on the detection.

26. The method of claim 25, wherein the second node is only passively involved in the return of the signal.

27. The method of claim 25, wherein the second node is a passive termination unit.

28. The method of claim 25, wherein the passive element is selected from a group consisting of an optical splitter and an optical filter.

29. The method of claim 25, wherein the passive element is an optical de-multiplexer.

30. The method of claim 25, wherein the passive element is the second node, and the second node is the passive element.

31. The method of claim 25, wherein the optical path extends through at least one optical connector intermediate an output of the first node and the input of the second node.

32. The method of claim 31, wherein the at least one optical connector is a patch panel.

33. The method of claim 25, wherein the optical path extends through at least one additional node intermediate the first node and the second node.

34. The method of claim 25, wherein the first node comprises a transmit amplifier, and wherein the control of whether the first node outputs onto the optical path an optical power greater than the given level comprises control of whether the transmit amplifier outputs an optical power greater than the given level.

35. The method of claim 25, wherein the optical path extends at least in a Data Center Interconnect (DCI) application.

36. The method of claim 25, wherein the signal returned by the second node is received by the first node over an optical path that at the first node is separate from the optical path along which the signal is communicated from the first node to the second node.

37. The method of claim 25, wherein the signal comprises a pilot tone.

38. The method of claim 25, wherein the signal comprises a tone having a frequency that is also used by the optical network for another purpose selected from a group consisting of optical filter optical supervisory channel (OSC), optical time-domain reflectometer (OTDR), and dispersion measurement.

39. The method of claim 25, wherein the signal comprises at least one communication wavelength output by the first node within the communication band.

40. The method of claim 25, wherein the signal involves modulating power of at least one communication wavelength output by the first node within the communication band.

41. The method of claim 25, wherein the detection on which the control is based is at least a positive detection of completeness.

42. The method of claim 25, wherein the detection on which the control is based is at least a negative detection of completeness.

43. The method of claim 25, wherein the optical path extends at least in a Data Center Interconnect (DCI) application, and wherein the second node is entirely passive, and wherein the first node comprises a transmit amplifier, and wherein the control of whether the first node outputs onto the optical path an optical power greater than the given level comprises control of whether the transmit amplifier outputs an optical power greater than the given level.

44. A node for an optical network, comprising:
an output from which the node is configured to, in a first mode of operation, communicate an optical power greater than a given level onto an optical path of the optical network;
a detector configured to detect completeness of the optical path, the detection being based at least on whether a signal the node is configured to communicate onto the optical path is received by the node;
wherein the node is configured to, in a second mode of operation, not communicate from the output an optical power greater than the given level; and
wherein the node is further configured to switch from one of the two modes of operation to the other mode of operation, based at least on the detection.

45. The node of claim 44, wherein the node is configured to communicate with another node of the optical network that comprises a passive element to which the optical path at least extends, and wherein the passive element is configured to output an optical power that does not exceed a given level, and wherein the other node does not have an optical interface that provides customer access to any optical power that exceeds the given level along any portion of the optical path within the second node, and wherein the other node is configured to passively return the signal back toward the node provided that the optical path is complete between at least the node and an input to the other node.

46. The node of claim 45, wherein the optical path extends at least in a Data Center Interconnect (DCI) application, and wherein the other node is entirely passive, and wherein the node comprises a transmit amplifier, and wherein the switch from one of the two modes of operation to the other mode of operation comprises a change in control over whether the transmit amplifier outputs an optical power greater than the given level.

47. The node of claim 44, wherein the signal comprises a pilot tone.

48. The node of claim 45, wherein the signal comprises a tone having a frequency that is also used by the optical network for another purpose selected from a group consisting of optical filter optical supervisory channel (OSC), optical time-domain reflectometer (OTDR), and dispersion measurement.

49. The node of claim 44, wherein the signal comprises at least one communication wavelength the node is configured to output within a communication band.

50. The node of claim 44, wherein the signal involves modulating power of at least one communication wavelength the node is configured to output within a communication band.

* * * * *